United States Patent [19]
Bowers

[11] Patent Number: 5,687,673
[45] Date of Patent: Nov. 18, 1997

[54] ENTRY AND EXIT CONTROLS FOR ROTARY ANIMAL PLATFORM

[76] Inventor: John Murray Bowers, Grey Street, Murchison, New Zealand

[21] Appl. No.: 574,226

[22] Filed: Dec. 18, 1995

[30] Foreign Application Priority Data

Apr. 10, 1995 [NZ] New Zealand ............... 270905

[51] Int. Cl.$^6$ ..................................... A01K 1/12
[52] U.S. Cl. .......................... 119/14.04; 119/14.03
[58] Field of Search .................... 119/14.04, 14.03

[56] References Cited

U.S. PATENT DOCUMENTS 3,709,196  1/1973  Hicks ............... 119/14.04

FOREIGN PATENT DOCUMENTS

| | | | |
|---|---|---|---|
| 7907072 | 3/1981 | Netherlands ............ | 119/14.04 |
| 156268 | 4/1969 | New Zealand . | |
| 156089 | 5/1970 | New Zealand . | |
| 159663 | 6/1971 | New Zealand . | |
| 163989 | 6/1972 | New Zealand . | |
| 167711 | 10/1973 | New Zealand . | |
| 175730 | 10/1974 | New Zealand . | |
| 1391347 | 4/1975 | New Zealand ............ | 119/14.04 |
| 177856 | 12/1975 | New Zealand . | |
| 209879 | 1/1987 | New Zealand . | |
| 1308644 | 2/1973 | United Kingdom ......... | 119/14.04 |
| 1398596 | 6/1975 | United Kingdom ......... | 119/14.04 |
| 2016253 | 9/1979 | United Kingdom ......... | 119/14.04 |

*Primary Examiner*—Edgar S. Burr
*Assistant Examiner*—Daniel J. Colilla
*Attorney, Agent, or Firm*—Ross, Ross & Flavin

[57] ABSTRACT

A rotary milking platform with a means of entrance and egress of animals in which each milking bail (4) is defined by two restraining rails (5). The angle of the bails ($\alpha$) and the direction of rotation of the platform (arrow A) are both either clockwise or counter-clockwise so that a milked animal leaving via the exit means (7) can be seen by the next animal on the platform (2) to finish milking. The exit path (7) incorporates a curved restraining rail (8) against which an animal leaving the platform (2) is backed such that only the animal's front feet remain on the platform (2). The movement of the platform (2) turns the animal (Arrow E) and the shape and placement of the curved restraining rail (8) guides the animal to the exit means (7). The entrance pathway (6) is radially aligned so that an animal entering the platform (arrow B) is oriented to step onto the annulus (3) into a bail (4).

8 Claims, 1 Drawing Sheet

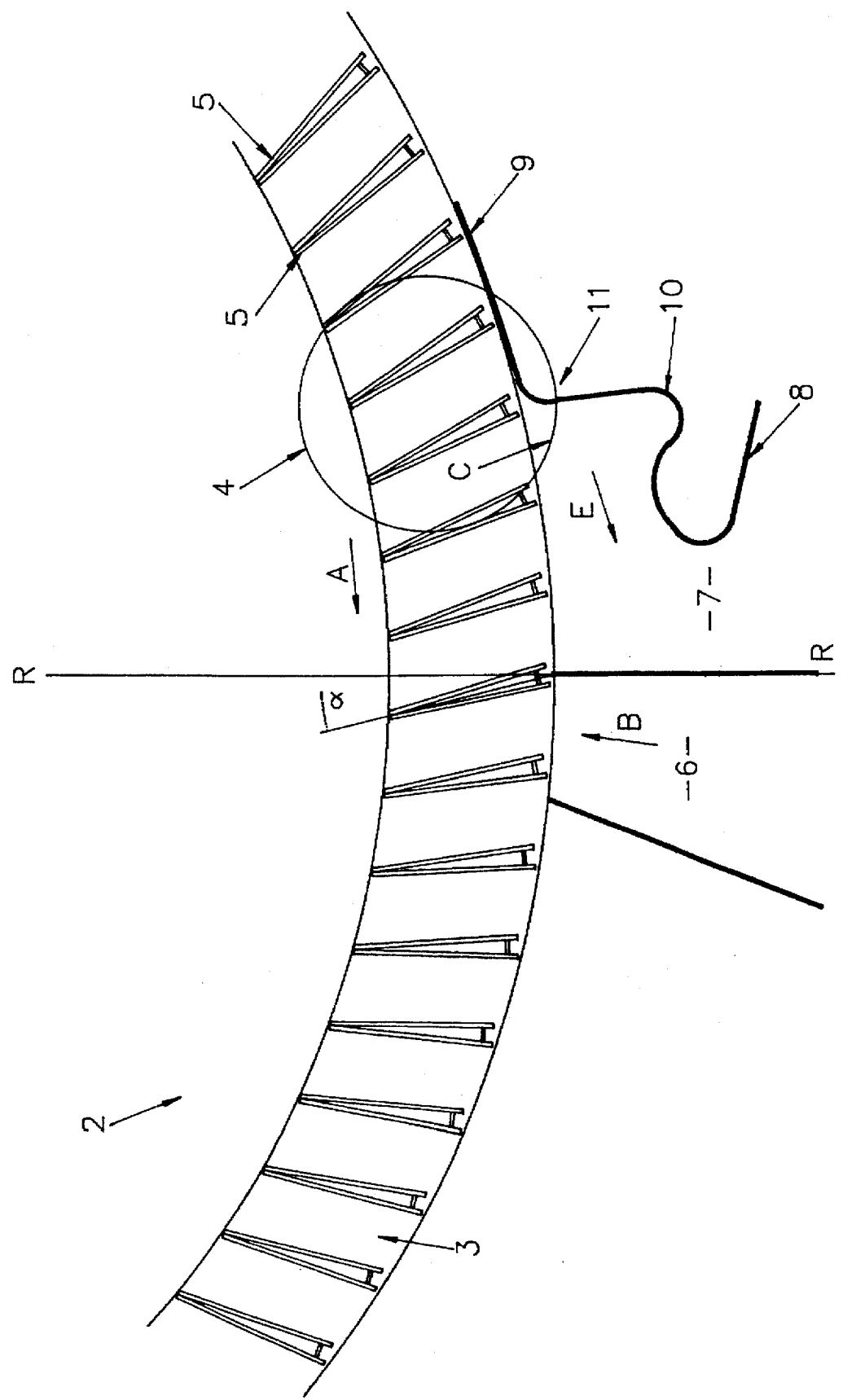

ENTRY AND EXIT CONTROLS FOR ROTARY ANIMAL PLATFORM

TECHNICAL FIELD

The present invention relates to improvements for the entry and exit controls for a rotary animal platform, and more particularly for a rotary milking platform for cows.

BACKGROUND ART

At present there are a variety of ways of providing for the smooth and efficient entry and exit of animals from a rotary platform. Examples are to be seen in New Zealand patent Nos. 156268, 159663/162587, 177856, 156089, 167711, 175730, 163989 or 209879. All these patents describe various ways of improving the means of entrance or egress for animals on rotary platforms. Some ensure that the animal is able to leave the platform head-first, either by walking across the annulus of the platform, or by providing a passageway (temporary or permanent) on the platform. Some provide moveable stalls or bail rails that move out of the way of the turning/moving animal. Some provide that the entry and exit means for the animals are not adjacent or that the animals are not radially positioned on the platform.

An object of the present invention is the provision of an improved entry and exit means for a rotary platform, which does not require part of the platform to be a temporary or permanent pathway, which does not require the animal to move across the rotary platform, and which means the entry and exit areas to a platform may be adjacent one another.

A further object of the present invention is the provision of an improved entry and exit means for a rotary platform where the angling of the exit within the exit means encourages a faster animal flow by allowing one animal to see the preceding animal exiting and by providing only a very short distance that the animal must cover in order to be moved off the platform. This will permit a faster rotation for increased throughput of animal milking, especially on the larger sized platforms.

A further object of the present invention is the provision of an entry and exit means which may be used for any size shed and especially a 60 or 80 or larger bail shed (i.e. a very large rotary platform).

DISCLOSURE OF INVENTION

The present invention provides an entry means and an exit means from a rotary animal platform, in which said platform comprises a horizontally disposed annular platform mounted for rotational movement about a vertical central axis, the upper side of said platform being evenly divided into a plurality of bails each being sized to receive therein an animal and being open at at least the outer end, each said bail having a restraining rail along each side thereof and each bail being offset on an angle to a radial line through the bail, said offset angle being such that a milked animal exiting via the exit means can be seen by the next animal on the platform to finish milking and exit the platform; wherein said exit means incorporates a curved restraining rail positioned adjacent the platform against which an animal leaving the platform is backed such that the animal's front feet only are on the platform, wherein the direction of movement of the platform is such that the movement of the platform turns the animal away from the centre of the platform and one of the bail restraining rails, with the curved restraining rail assisting in guiding the animal to the exit means.

Preferably said exit means is set on an angle to a radius through the platform.

Preferably the side rails of adjacent bails are common rails. Preferably the entry and exit ways are adjacent one another. Preferably the entry means is a path that is radially aligned. However an alternative to this is an entry path that can be aligned with each offset bail as the platform rotates, so there can be a straight line from the entry path into a bail.

Preferably the angle that all the bails are set on, relative to any radius of the platform, is between 10° and 60°, herringboned in a clockwise direction, if the direction of rotation of the platform is clockwise. The angle of the bails and the direction of rotation of the platform are both either clockwise or anti-clockwise so that one animal coming off the platform can be seen by the next animal adjacent, due to come off the platform after the animal exiting.

BRIEF DESCRIPTION OF DRAWING

By way of example only, a preferred embodiment of the present invention is described in detail with reference to a cattle milking platform and to the accompanying drawing which is a partial plan view of a rotary shed with the preferred embodiment of the present invention.

MODE FOR CARRYING OUT THE INVENTION

Referring to the drawing, a rotary milking platform 2 (of 80 bails) is thereshown, in pan. The platform 2 comprises an annulus 3 with a plurality of milking bails 4. Each bail 4 is set at an angle to a radial line RR of the platform 2, in a herringbone arrangement. The angle $\alpha$ of the bail 4 to said radial line of the platform 2 is in the range 10° to 60°, preferably 45°.

Each bail 4 has two bail restraining rails 5 which are wedge-shaped. Each wedge-shaped rail 5 is tapered toward the centre of the platform 2, with the angle on inclination $\alpha$ being with reference to the centre line of the wedge-shape. Each rail 5 is common to two bails 4. Alternatively, if so desired, the rails 5 may be single straight rails. Both alternatives are of known type and materials.

The platform 2 rotates in a clockwise direction as shown by arrow A. The bails 4 are positioned so that the herringbone is arrayed in the clockwise direction. If so desired, the direction of motion of the platform 2 may be counter-clockwise, and the herringbone bails 4 may be arranged in the counter-clockwise direction.

The entrance pathway 6 is shown as being radially aligned, so that cattle entering (arrow B) the platform 2 enter straight and as they step onto the platform 2.

As the cattle set onto the platform 2 they are turned slightly with the motion of the platform 2 (and thus their front feet) in a clockwise direction. This puts each cattle beast in a position that is aligned with each bail 4 to be entered. So the beast apparently walks straight into the bail 4. In actual fact the platform 2 rotates to effect this.

The exit path 7 incorporates a curved restraining rail 8 which is connected to a primary restraining rail 9 around part of the platform 2. The curved restraining rail 8 incorporates an arcuate portion 10 which is shaped to receive therein the hind end of a cattle beast. A neck portion 11 is contiguous with the arcuate portion 10 and the curved restraining rail 8. This neck portion 11 and arcuate portion 10 combines with the end of each bail restraining rail 5 to encourage each cattle beast to turn, leave the bail 4 and to enter the exit path 7.

As the platform 2 rotates to the point where the cattle beast is ready to leave the platform 2 and the bail 4 is adjacent the arcuate portion 10, the beast is encouraged to back out of its bail 4 (arrow C). This places the back end of the beast in the area created by the arcuate portion 10. The movement of the platform 2 (with the front legs of the beast) and the fact of the stationary rear legs of the beast mean that the beast is partly turned away from the bail 4 and platform 2. The shape and placement of the outer end of the bail restraining rail 5 and the neck portion 11 of the exit restraining rail 8 means that the beast is urged along to the exit path 7 (arrow E).

If so desired the entrance path 6 and exit path 7 may be placed adjacent one another. Thus adjacent rails in the yards (not shown) of the milk shed could be common rails. Also, any covering over the entrance and exit areas could be contiguous.

The preferred embodiment has been described above with reference to a radially aligned entrance path 6. However, it will be appreciated that this could be at an angle to the radius (in the direction of rotation of the platform 2), if so desired. It may however be necessary to have a slightly wider entrance path 6, to allow for the slightly angled movement of the cattle as they enter a bail 4.

I claim:

1. A rotary animal platform having an entry means and an exit means, in which said platform comprises a horizontally disposed annular platform mounted for rotational movement about a vertical central axis, the upper side of said platform being evenly divided into a plurality of bails each being sized to receive therein an animal and being open at at least the outer end, each said bail having a restraining rail along each side thereof and each bail being offset on an angle to a radial line through the bail wherein said exit means incorporates a curved restraining rail positioned adjacent the platform against which an animal leaving the platform is backed such that the animal's front feet only are on the platform, wherein the direction of movement of the platform is such that the movement of the platform turns the animal away from the centre of the platform and one of the bail restraining rails, with the curved restraining rail assisting in guiding the animal to the exit means.

2. A rotary animal platform having an entry and exit means as claimed in claim 1 wherein adjacent bails have a common restraining rail.

3. A rotary animal platform having an entry and exit means as claimed in claim 1 wherein entry and exit ways for the entry means and exit means respectively are adjacent one another and said exit means is set on an angle to a radius through the platform.

4. A rotary animal platform having an entry and exit means as claimed in claim 1 wherein the entry means includes a path that is radially aligned with reference to the platform.

5. A rotary animal platform having an entry and exit means as claimed in claim 3 wherein the entry means includes a path that is radially aligned with reference to the platform.

6. A rotary animal platform having an entry and exit means as claimed in claim 1 wherein the angle that all the bails are set on, relative to any radius of the platform, is between 10° and 60°, herringboned in a clockwise direction as the direction of rotation of the platform is clockwise.

7. A rotary animal platform having an entry and exit means as claimed in claim 2 wherein the angle that all the bails are set on, relative to any radius of the platform, is between 10° and 60°, herringboned in a clockwise direction as the direction of rotation of the platform is clockwise.

8. A rotary animal platform having an entry and exit means as claimed in claim 2 wherein the restraining rail of the exit means is connected to a second restraining rail of the exit means incorporating an arcuate portion which is shaped to receive therein the hind end of a cattle beast, and a neck which is contiguous with the arcuate portion, the neck portion combining with the end of each bail restraining rail to encourage each cattle beast to turn, leave the bail and to enter the exit means.

* * * * *